UNITED STATES PATENT OFFICE.

ERNST KÖNIG, OF HÖCHST-ON-THE-MAIN, GERMANY, ASSIGNOR TO THE FARBWERKE, VORMALS MEISTER, LUCIUS & BRÜNING, OF SAME PLACE.

BROWN-YELLOW AZO DYE AND PROCESS OF MAKING SAME.

SPECIFICATION forming part of Letters Patent No. 626,913, dated June 13, 1899.

Application filed November 18, 1897. Serial No. 659,021. (Specimens.)

*To all whom it may concern:*

Be it known that I, ERNST KÖNIG, doctor of philosophy, a citizen of the Empire of Germany, residing at Höchst-on-the-Main, Germany, have invented certain new and useful Improvements in the Manufacture of Basic Azo Dyestuffs Soluble in Water, of which the following is a specification.

This invention relates to the production of basic azo dyestuffs soluble in water.

I have found that valuable basic azo dyestuffs may be obtained from aromatic amido-ammonium bases of the general formula:

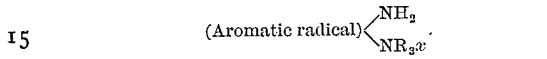

by diazotizing these bases and combining them with passive azo compounds — *i. e.*, bodies reacting with diazo compounds — such bodies being phenols, aromatic amins, oxy and amido azo compounds.

The new dyestuffs have the general formula:

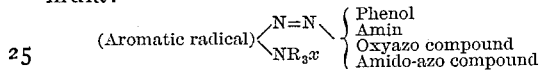

and are products soluble in water, dyeing cotton mordanted with tannin.

I proceed, for instance, as follows: 37.3 kilos of amidophenyltrimethylammoniumchlorid are dissolved in water, to which are added fifty-two kilos of hydrochloric acid of thirty per cent. and diazotized with 13.8 kilos of nitrite of sodium. The diazo solution thus obtained is mixed with eleven kilos of resorcinol, to which are added thirty-five kilos of sodium acetate. From the dyestuff solution thus formed the dyestuff separates out on addition of chlorid of zinc as a dark-brown resinous mass, becoming solid after a short time.

In a dry state the dyestuff forms a red-brown powder, easily soluble in water with a brown-yellow color.

The dyestuff is soluble with great difficulty in alcohol, insoluble in ether and petroleum, soluble in concentrated sulfuric acid with a brown-yellow color, dyeing cotton and leather mordanted with tannin in brown-yellow tints, characterized by their great fastness to light.

Having thus described my invention, what I claim is—

1. The process for the manufacture of basic azo dyestuffs soluble in water, of the general formula

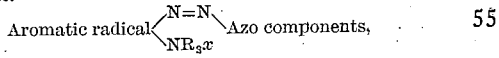

for the dyeing of cotton mordanted with tannin, consisting in diazotizing aromatic amido-ammonium bases and treating the resulting compound with substances adapted to unite with diazo bodies to form dyes, substantially as set forth.

2. As a new product the yellow-brown dyestuff obtained from diazotized amidophenyl-trimethylammonium and resorcinol, being a red-brown powder, easily soluble in water with a red-brown color, sparingly soluble in alcohol, insoluble in ether and petroleum; soluble in concentrated sulfuric acid with a brown-yellow color, dyeing cotton and leather mordanted with tannin brown-yellow.

In testimony that I claim the foregoing as my invention I have signed my name in presence of two subscribing witnesses.

ERNST KÖNIG.

Witnesses:
HEINRICH HAHN,
ALFRED BRISBOIS.